(12) United States Patent
Colby

(10) Patent No.: US 6,452,360 B1
(45) Date of Patent: Sep. 17, 2002

(54) AUTO TUNING AND PARAMETER IDENTIFICATION OF A CONTROL CIRCUIT

(75) Inventor: Roy Stephen Colby, Raleigh, NC (US)

(73) Assignee: Square D. Company, Palatine, IL (US)

( * ) Notice: Subject to any disclaimer, the term of this patent is extended or adjusted under 35 U.S.C. 154(b) by 0 days.

(21) Appl. No.: 09/454,048

(22) Filed: Dec. 3, 1999

(51) Int. Cl.$^7$ ................................................ H02P 5/28
(52) U.S. Cl. ........................ 318/798; 318/677; 318/619; 318/560; 318/563; 318/565; 318/566; 318/671
(58) Field of Search .............................. 318/677, 619, 318/560, 561, 563, 565, 566, 671

(56) References Cited

U.S. PATENT DOCUMENTS

| 5,786,678 A | * | 7/1998 | Kobayashi et al. | ......... 318/560 |
| 5,880,415 A | | 3/1999 | Colby et al. | ................. 187/393 |
| 5,880,416 A | | 3/1999 | Colby et al. | ................. 187/393 |
| 5,883,344 A | | 3/1999 | Colby et al. | ................. 187/393 |
| 5,896,954 A | | 4/1999 | Colby et al. | ................. 187/391 |
| 5,912,813 A | | 6/1999 | Kerkman et al. | ............. 363/98 |
| 5,917,721 A | | 6/1999 | Kerkman et al. | ............. 363/98 |
| 5,923,144 A | | 7/1999 | Seibel et al. | ................. 318/805 |
| 5,965,995 A | | 10/1999 | Seibel et al. | ................. 318/805 |
| 5,990,658 A | | 11/1999 | Kerkman et al. | ........... 318/811 |
| 6,014,497 A | | 1/2000 | Kerkman et al. | ........... 388/811 |
| 6,023,417 A | | 2/2000 | Hava et al. | .................... 363/41 |

* cited by examiner

Primary Examiner—Karen Masih
(74) Attorney, Agent, or Firm—Michael J. Femal; Larry I. Golden

(57) ABSTRACT

A method for calculating a first and second gain for a controller circuit for a plant is disclosed. The method comprises the steps of providing a reference model circuit with desired circuit characteristics, providing a reference model adaptive circuit, setting the second gain to zero, supplying a spectrally rich input signal to the reference model and to the controller circuit, determining the first gain by continuously adjusting the first gain until an output of the reference model and an output of the controller circuit are substantially equal, setting the first gain to the previously determined value, determining the second gain by continuously adjusting the second gain until an output of the reference model and an output of the controller circuit are substantially equal and setting the second gain to the previously determined value.

10 Claims, 5 Drawing Sheets

AUTO TUNING AND PARAMETER IDENTIFICATION OF A CONTROL CIRCUIT

TECHNICAL FIELD

This invention relates to automatic calibration of a controller for control of a plant.

BACKGROUND OF THE INVENTION

In the past, AC motor controls have applied balanced three phase voltages to the three stator phases based on the electromechanical characteristics of the motor and on an equivalent circuit model for the motor in the steady state. Therefore, the desired performance characteristics were achieved only in the steady state and control of the the AC machine in the transient state was less precise than that of a DC machine.

With the advent of Field Oriented Control (FOC) of three phase AC machines, the ability to very precisely and separately control transient and steady state quantities of torque and flux in AC machines has become possible. As a result, the AC machine gains the advantages of a DC machine without the drawback of mechanical commutation. FOC is based on three major points: the machine current and voltage space vectors, the transformation of a three phase speed and time dependent system in to a two-coordinate (d, q) time invariant system and effective pulse width modulation pattern generation. Due to advancements in modern semiconductors in both power and signal electronics, precise control of these points has become possible. FOC has become well known in the art of 3 phase AC machine control.

In FOC control, it is known to use proportional-plus-integral (PI) closed loop control of motor current to provide synchronous control of three phase AC motor currents. In order for a PI control to accurately control the AC motor currents, it must be precisely tuned to the electromagnetic dynamics of the motor. In particular, for a PI controller, the proportional gain and the integral gain should be matched to the inductive and resistive characteristics of the particular three phase AC motor to be controlled to provide accurate control of the AC motor currents. The more precisely the controller gains are tuned to the particular motor, the more precisely the motor can be controlled. However, because no two electrical motors have exactly the same electromagnetic characteristics, each controller must be individually tuned to the motor it is intended to control.

One method to used is to determine the motor equivalent inductance by applying a pulse to two phases of the motor and estimating the inductance from the equation $L=V/(di/dt)$ where V is the DC bus voltage and $(di/dt)$ is the rate of rise of the current. This method, however, has been shown to produce errors due to parasitic high frequency effects in the motor. The stator resistance is measured by applying a low DC voltage to the stator and measuring the resultant current.

Another method of determining the electromagnetic characteristics of an AC machine is disclosed in U.S. Pat. No. 5,880,415 (the '415 patent). The disclosure of the '415 patent teaches a method for calculating a proportional gain, an integral gain of an integrator, and an overall gain for an elevator motor controller current regulator compensation, the controller and motor forming a current loop, including:
a) minimizing the contribution of the integrator to the controller during steps (b)–(f); b) setting the proportional gain to an initial value; c) setting the overall gain based on a first test frequency; d) providing a sinusoidal current reference signal to the current regulator at the first test frequency; e) calculating an open loop gain of the current loop at the first test frequency; f) varying the proportional gain and performing steps (e) until the open loop gain is within a predetermined tolerance of 1; g) providing the sinusoidal current reference signal to the current regulator at a second test frequency; h) calculating a closed loop gain of the current loop at the second test frequency; and i) varying the integral gain and performing step (h) until the closed loop gain is within a predetermined tolerance of 1. This method however applies only a single frequency sinusoid to the circuit and uses an iterative technique to tune the controller.

SUMMARY OF THE INVENTION

The present invention discloses a circuit and method for calculating a first and second gain for a controller circuit for a plant comprising the steps of providing a reference model circuit with desired circuit characteristics, providing a reference model adaptive circuit, setting the second gain to zero, supplying a spectrally rich input signal to the reference model and to the controller circuit, determining the first gain by continuously adjusting the first gain until an output of the reference model and an output of the controller circuit are substantially equal, setting the first gain to the previously determined value, determining the second gain by continuously adjusting the second gain until an output of the reference model and an output of the controller circuit are substantially equal, and setting the second gain to the previously determined value.

The invention represents a significant improvement over the prior art by allowing the controller gain parameters to be automatically determined. Thus, the invention greatly reduces cost associated with tuning the controller to a plant and while providing a more finely tuned result.

DETAILED DESCRIPTION OF THE INVENTION

Figure 1:
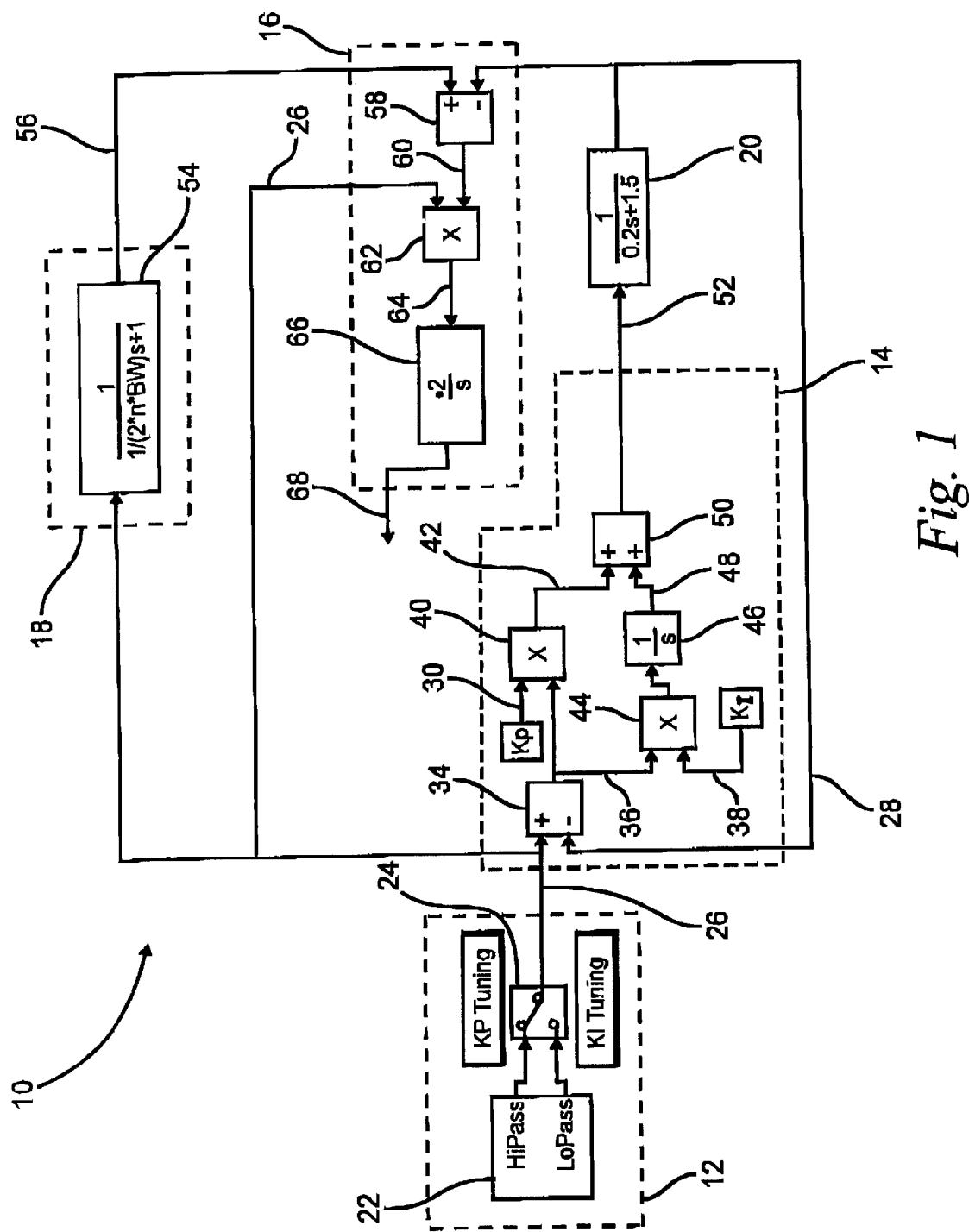
FIG. 1 is a block diagram of a circuit in accordance with an embodiment of the present invention.

While the invention is susceptible of embodiment in many different forms, there is shown in the drawings and will herein be described in detail a preferred embodiment of the invention. It is to be understood that the present disclosure is to be considered only as an example of the principles of the invention. This disclosure is not intended to limit the broad aspect of the invention to the illustrated embodiments. The scope of protection should only be limited by the accompanying claims.

Referring to FIG. 1 a block flow diagram of a circuit 10 in accordance with the present invention is shown. The circuit comprises four sections: a noise input section 12 a controller section 14, a Model Reference Adaptive System (MRAS) section 16 and a reference model section 18. Additionally, a plant 20 to be controlled is shown. The plant 20 is shown with the transfer function 1/(0.02s+1.5) which is representative of an inductive load, such as an AC induction motor, but could be any electrical load with any transfer function. The plant 20 can be a single phase or three phase machine and can include converter circuitry such as a three phase current converter for a three phase machine. Additionally the controller section 14 is shown as a proportional plus integral (PI) controller. However, as would be understood by one of ordinary skill in the art, the controller could implement any one or combination of proportional, integral or derivative controls, as determined by the type of load being controlled.

The noise input section 12 comprises a broadband noise generator 22 having a high pass output and a low pass output, the outputs each having a cutoff frequency of, for example, 50 Hz. The broadband noise generator may be any signal that creates a random signal. The noise input section also comprises a switch 24 which is used to switch from the high pass and low pass outputs of the broadband noise generator 22.

The controller section 14 is a known PI controller which receives an input signal 26 from the noise input section 12 and a feedback signal 28 from the plant section 20. In block 34, the controller section 14 subtracts the feedback signal 28 from the input signal 26 to generate an error signal 36. The error signal 36 is then multiplied by a proportional gain signal 30 in block 40 to generate a proportional gain resultant signal 42. The error signal 36 is also multiplied by an integral gain signal 38 in block 44 and integrated in block 46 to generate an integrated gain resultant signal 48. The proportional gain resultant signal 42 and the integrated gain resultant signal 48 are then added in block 50 to generate a controller output signal 52.

The reference model section 18 has a transfer function equal to a desired transfer function of the controller section 14 and the plant 20, shown in this instance to be $1/(1/((2*\pi*BW)*s+1))$. In operation the reference model section 18 receives the input signal 6 and multiplies it by the desired transfer function in block 54 to generate a model reference output signal 56.

The MRAS section 16 receives the input signal 26, the feedback signal 28 and the reference model output signal 56. In block 58, the MRAS section 16 subtracts the feedback signal 28 from the reference model output signal 56 to generate a reference model error signal 60. The reference model error signal 60 is then multiplied in block 62 by the input signal 26 to generate a coherent power of the error signal 64. The coherent power of the error signal 64 is then multiplies by a gain, such as .2, and integrated in block 66 to generate an MRAS output signal 68.

Figure 2:
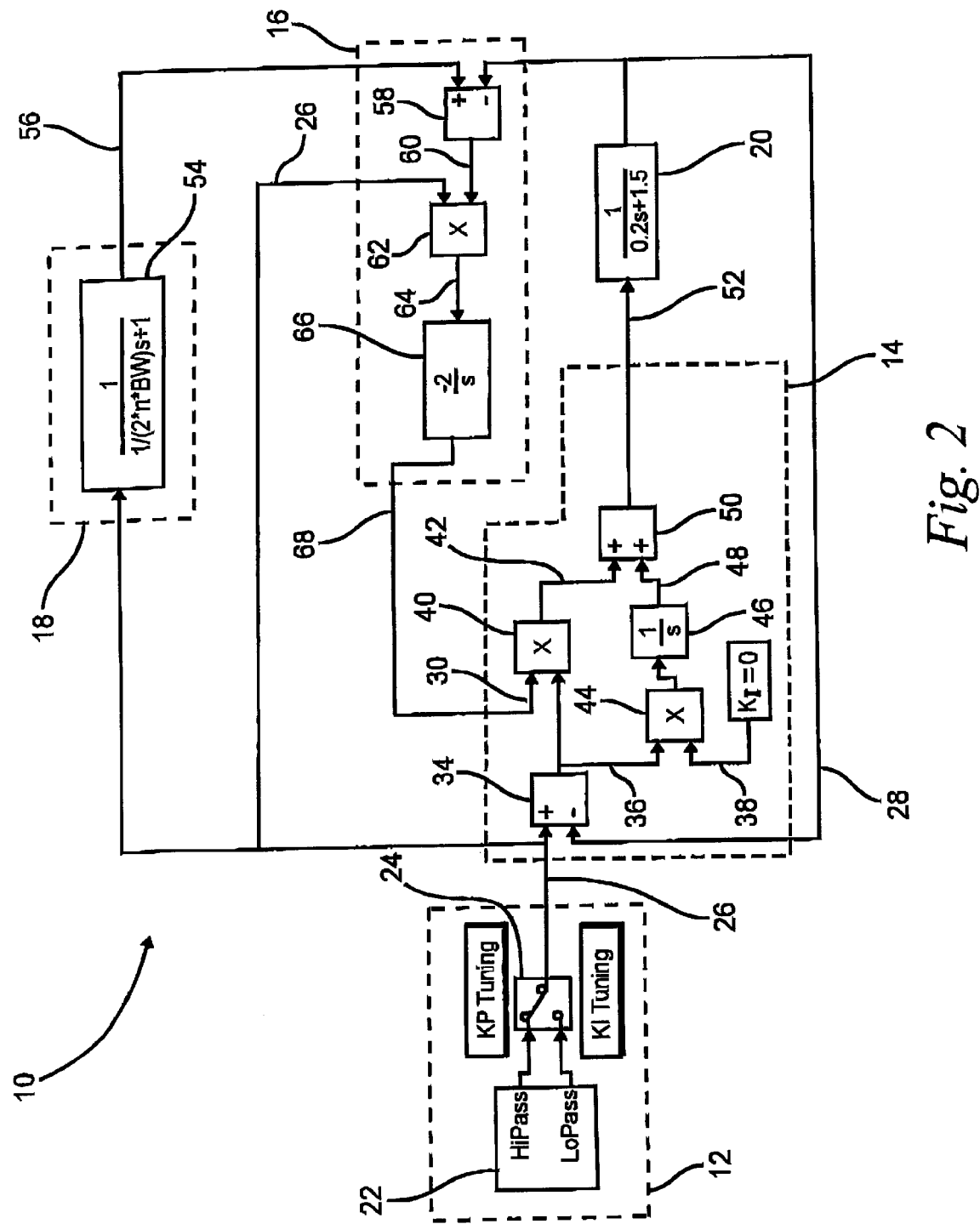
FIG. 2 is a block diagram of the circuit of FIG. 1 with the MRAS output signal electrically connected to the proportional gain signal..
Figure 3:
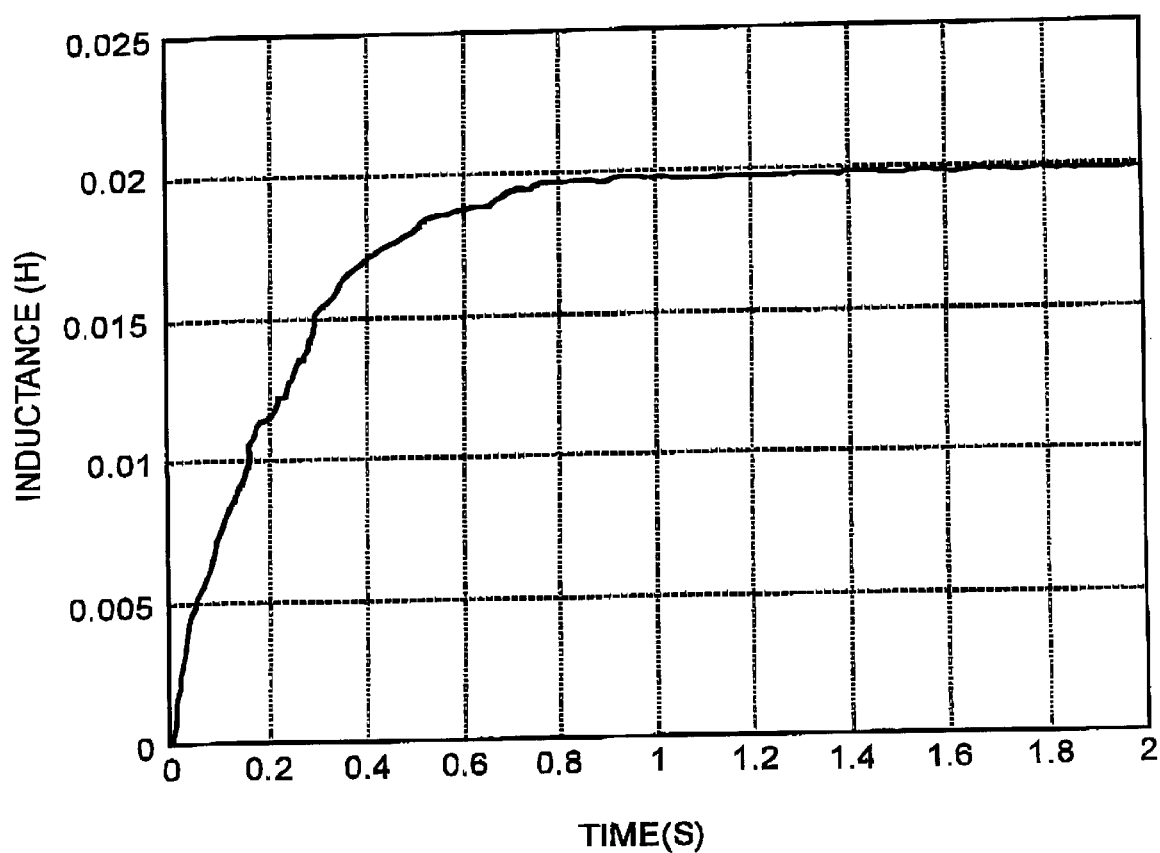
FIG. 3 is a graph of the value of the MRAS output signal over time.
Figure 4:
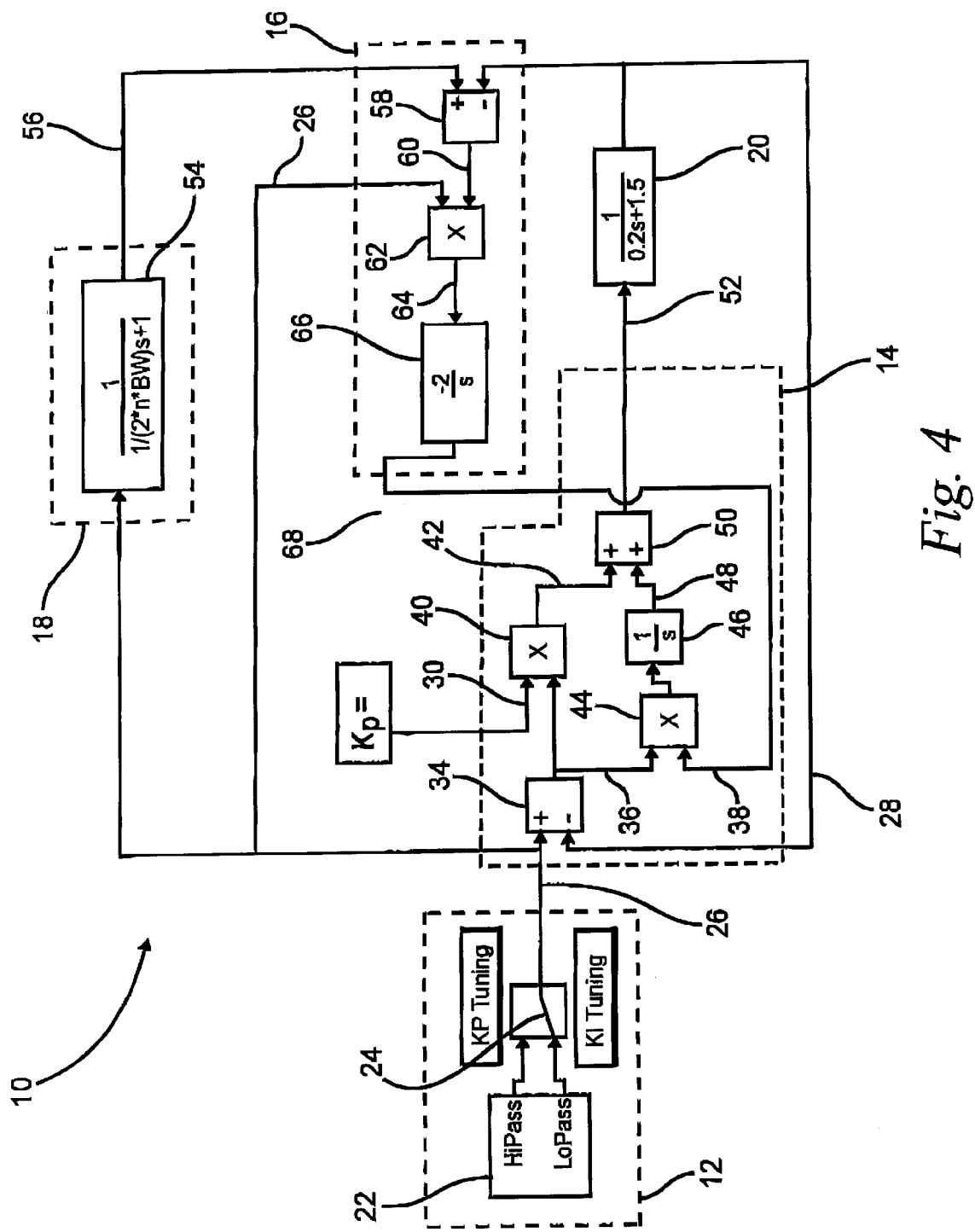
FIG. 4 is a block diagram of the circuit of FIG. 1 with the MRAS output signal electrically connected to the integral gain signal..

In order to find correct values of the proportional gain signal 30 and the integrated gain signal 38, the present invention first connects the MRAS output signal 68 to the proportional gain signal 30 and sets the integrated gain signal 38 to zero, as shown in FIG. 2. The switch of the noise signal input section 12 is set to receive the high pass output of the broadband noise generator 22 and the controller section and plant are allowed to operate side-by-side to the reference model section 18. The difference of the reference model output signal 56 and the feedback signal 28 is calculated and integrated in the MRAS section 16 and the MRAS output signal 68 is applied to the proportional gain signal 30 of the controller section 14. Because the MRAS output signal 68 is integrated, the value of the MRAS output signal 68 will change until it approaches a value of a proportional gain of the reference model section 18. FIG. 3 is a plot of the value of the MRAS output signal 68 over time. It can be seen that the value of the MRAS output signal 68 converges to a correct value for proportional gain signal 30 within 2 seconds.

Figure 5:
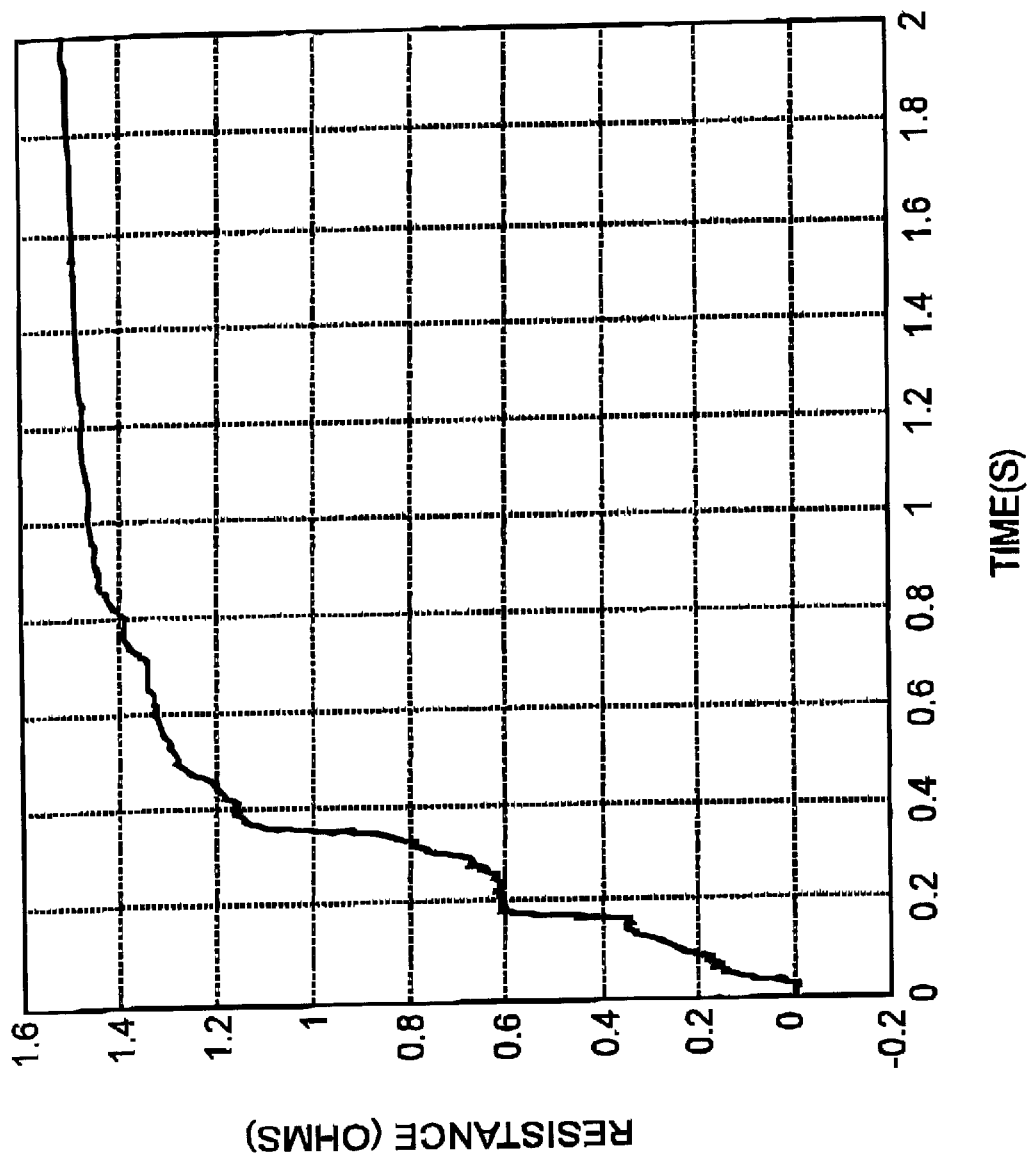
FIG. 5 is a graph of the value of the MRAS output signal over time.

Next, the correct value of the integrated gain signal 38 is found by setting the proportional gain signal 30 to the value determined in FIG. 3 and connecting the MRAS output signal 68 to the integrated gain signal 38. The switch 24 of the input section 12 is switched to the low pass output of the noise generator 22 and the controller section and plant are allowed to operate side-by-side to the reference model section 18, as above. The difference of the reference model output signal 56 and the feedback signal 28 is calculated and integrated in the MRAS section 16 and the MRAS output signal 68 is applied to the integrated gain signal 38 of the controller section 14. Because the MRAS output signal 68 is integrated, the value of the MRAS output signal 68 will change until it approaches a value of a integral gain of the reference model section 18. FIG. 5 is a plot of the value of the MRAS output signal 68 over time. It can be seen that the value of the MRAS output signal 68 converges to a correct value for the integrated gain signal 38 within 2 seconds.

While the specific embodiments have been illustrated and described, numerous modifications come to mind without significantly departing from the spirit of the invention, and the scope of protection is only limited by the scope of the accompanying claims.

I claim:

1. A method for tuning a controller for a plant comprising the steps of:
    setting an integral gain of the controller to zero;
    supplying a spectrally rich input signal to a reference model and to the controller;
    connecting a reference model adaptive system to a proportional gain input of the controller;
    determining a proportional gain for the controller by continuously adjusting a gain of the model reference adaptive system until an output of the reference model and an output of the controller and the plant are within a predefined tolerance;
    setting the proportional gain of the controller to the determined value;
    connecting the reference model adaptive system to the integral gain input of the controller; and
    determining the integral gain of the controller by continuously adjusting the gain of the model reference adaptive system until the output of the reference model and the output of the controller and the plant are within a predefined tolerance.

2. The method of claim 1, wherein the controller controls a three phase induction motor.

3. The method of claim 1, wherein within the step of determining a proportional gain for the controller, and within the step of determining an integral gain of the controller, the predefined tolerance is dependent upon the application of the controller.

4. A method for tuning a controller for a plant comprising the steps of:
    setting a second gain of the controller to zero;
    supplying a spectrally rich input signal to a reference modeland to the controller;
    connecting a reference model adaptive system to a first gain input of the controller;
    determining a first gain for the controller by continuously adjusting a gain of the model reference adaptive system until an output of the reference model and an output of the controller and the plant are within a predefined tolerance;

setting the first gain of the controller to the determined value;

connecting the reference model adaptive system to the second gain input of the controller;

determining the second gain of the controller by continuously adjusting the gain of the model reference adaptive system until the output of the reference model and the output of the controller are within a predefined tolerance.

5. The method of claim 4, wherein the controller controls a three phase induction motor.

6. The method of claim 4, wherein within the step of determining a proportional gain for the controller, and within the step of determining an integral gain of the controller, the predefined tolerance is dependent upon the application of the controller.

7. A device for tuning a controller for a plant having a plant output, the device comprising:

a reference model with a desired transfer function having a reference model input and a reference model output;

a reference model adaptive system having a MRAS input and a MRAS output, the MRAS input being the difference between the reference model output and the plant output and the MRAS output providing again for the controller;

a spectrally rich signal generator with a spectrally rich signal generator output electrically connected to the controller input and the reference model input.

8. The device of claim 1, wherein the controller controls a three phase induction motor.

9. An automated device for tuning a controller, wherein the device performs the steps of:

setting an integral gain of the controller to zero;

using a spectrally rich input signal as a reference model;

using a reference model adaptive system as a proportional gain;

determining a proportional gain for the controller by continuously adjusting a gain of the model reference adaptive system until an output of the reference model and an output of the controller are within a predefined tolerance;

setting the proportional gain to the determined value;

using the reference model adaptive system as the integral gain input of the controller; and determining the integral gain of the controller by continuously adjusting the gain of the model reference adaptive system until the output of the reference model and the output of the controller are within a predefined tolerance.

10. An automated device for tuning a controller, wherein the device performs the steps of:

setting a second gain of the controller to zero;

using a spectrally rich input signal to a reference model and to the controller;

using a reference model adaptive system to a first gain input of the controller;

determining a first gain for the controller by continuously adjusting a gain of the model reference adaptive system until an output of the reference model and an output of the controller and the plant are within a predefined tolerance;

setting the first gain of the controller to the determined value;

using the reference model adaptive system to the second gain input of the controller;

determining the second gain of the controller by continuously adjusting the gain of the model reference adaptive system until the output of the reference model and the output of the controller are within a predefined tolerance.

* * * * *